United States Patent [19]

Gassaway

[11] Patent Number: 4,935,905
[45] Date of Patent: Jun. 19, 1990

[54] METHOD AND APPARATUS FOR SEISMIC EXPLORATION

[75] Inventor: Gary S. Gassaway, San Amselmo, Calif.

[73] Assignee: Terra Linda Canada, Inc., Calgary, Canada

[21] Appl. No.: 389,539

[22] Filed: Aug. 4, 1989

[51] Int. Cl.[5] ............................................. G01V 1/36
[52] U.S. Cl. ........................................ 367/59; 367/38
[58] Field of Search .................... 364/421; 367/38, 43, 367/59, 60, 74

[56] References Cited

U.S. PATENT DOCUMENTS

| | | | |
|---|---|---|---|
| 3,344,881 | 10/1967 | White | 181/0.5 |
| 3,719,924 | 3/1973 | Muir et al. | 340/15.5 |
| 3,872,478 | 3/1975 | Lucole | 346/7 |
| 4,397,005 | 8/1983 | Gassaway et al. | 367/36 |
| 4,458,341 | 7/1984 | Goebel | 367/43 |
| 4,783,770 | 11/1988 | Dambom | 367/53 |

*Primary Examiner*—Ian J. Lobo
*Attorney, Agent, or Firm*—Victor R. Beckman

[57] ABSTRACT

A geophone is disclosed which includes at least two transducers having axes which are perpendicular to each other for generating Cartesian coordinate signal components in response to at least vertical and horizontal in-line seismic wave motion of the geophone. The Cartesian coordinate signal components are converted to polar coordinate signal form including vector length, L, and angle, $\theta$, signal values. Surface wave noise signal components, such as ground roll wave signals, included in the L and $\theta$ signals are attenuated, or suppressed, to obtain signals $L_B$ and $\theta_B$ proportional to body waves. The $L_B$ and $\theta_B$ signals are converted to Cartesian coordinate signal form for subsequent processing along with outputs from other geophones in a geophone array for locating underground formations, deposits, or the like. A third transducer may be included in the geophone for generating a third orthogonal signal component, and the three orthogonal signal components are converted to spherical polar coordinate signal form L, $\theta$ and $\delta$, which signals then are processed for suppression of ground roll wave signal components therefrom. Ground roll suppression includes averaging the polar coordinate signal components L, $\theta$ and $\delta$ to obtain $L_{GR}$, $\theta_{GR}$ and $\delta_{GR}$ signals proportional to the ground roll wave components. The ground roll wave components are subtracted from the respective L, $\theta$, and $\delta$ signal components to obtain ground roll wave suppressed signal components $L_B$, $\theta_B$ and $\delta_B$.

19 Claims, 6 Drawing Sheets

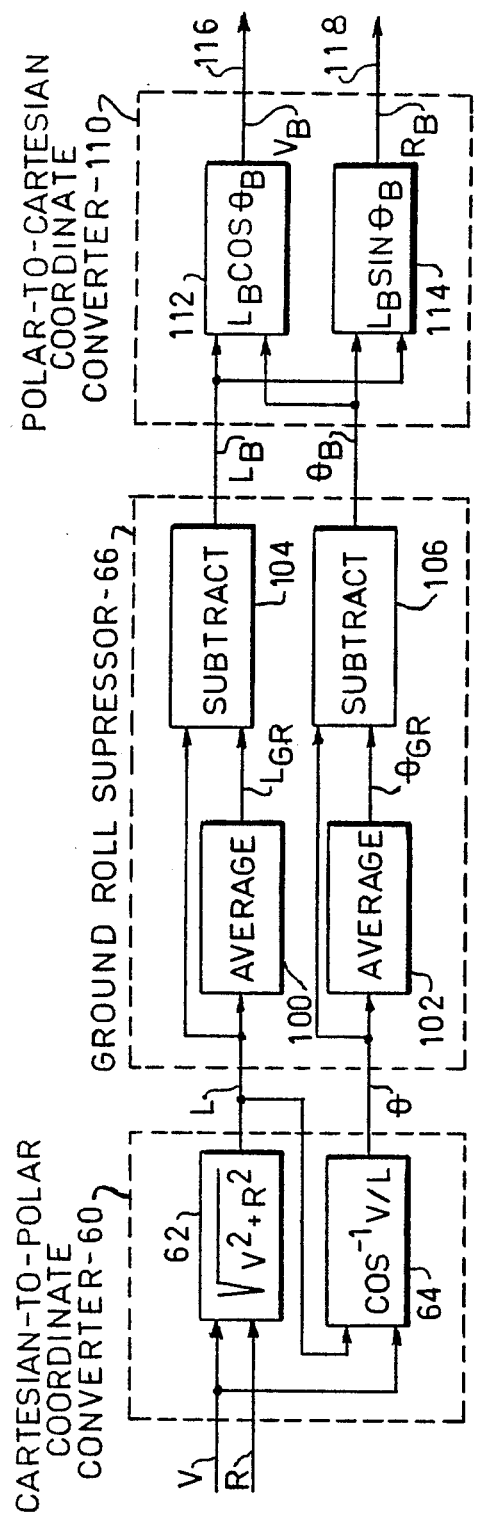
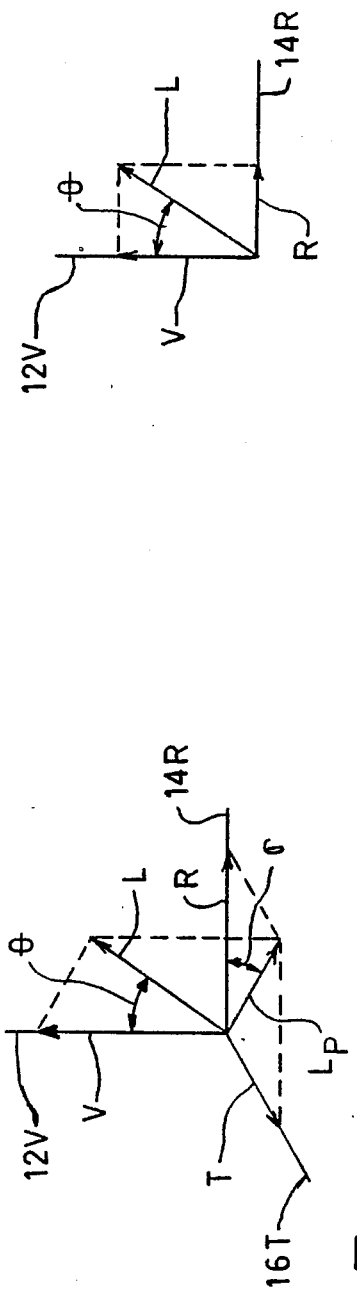
FIG-4
FIG-5
FIG-3

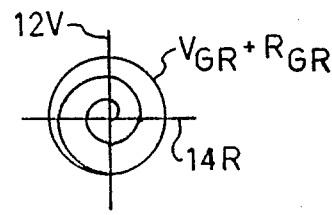
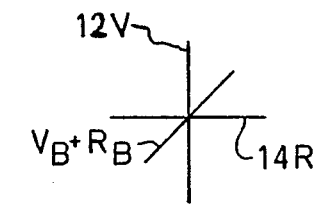
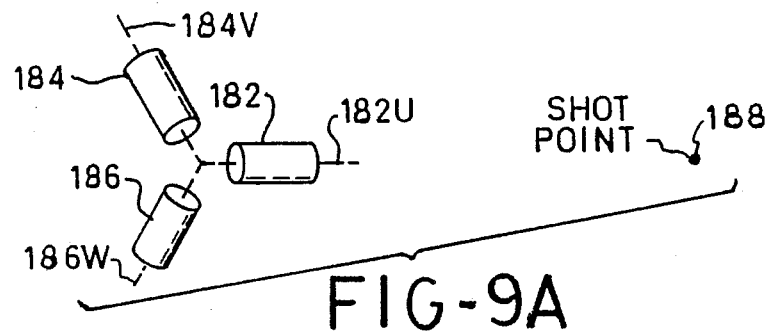
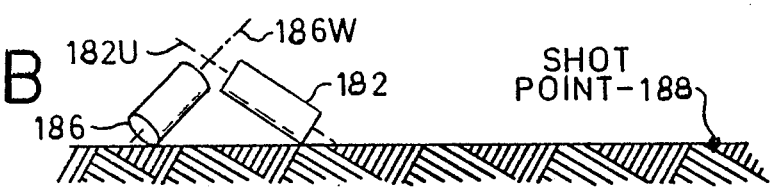
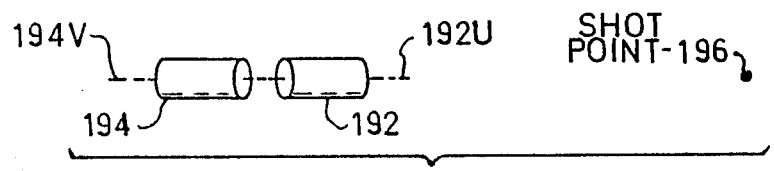
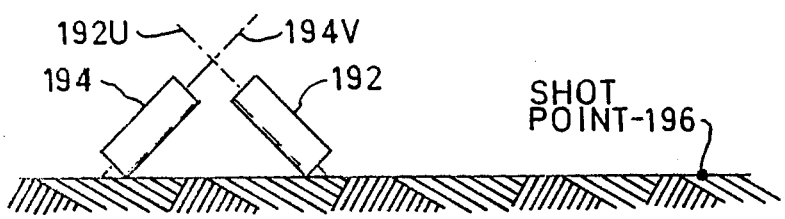

METHOD AND APPARATUS FOR SEISMIC EXPLORATION

TECHNICAL FIELD

This invention relates to method and apparatus for seismic exploration and particularly to method and means or suppressing ground roll signal components from the outputs of motion-sensing transducers included in a geophone.

BACKGROUND OF THE INVENTION

Seismic exploration involves generating seismic waves at or adjacent the surface of the earth, portions of which waves travel downwardly through the earth and are reflected from interfaces back to the earth's surface. Geophones sense the reflected waves at points spaced from the seismic source. Many geophones include a single motion-sensing transducer responsive only to the vertical component of the received seismic waves. Transducer outputs from an array of such single-transducer geophones often are electrically connected in series circuit, with the output from the series-connected transducers being supplied to one data channel of a multiple-channel recording device for recording of the composite signal from the geophone array. Generally, a plurality of geophone arrays are included at different distances from the seismic source to obtain a plurality of seismic records from groups of geophones. By employing arrays of series-connected or series-parallel connected geophones, the geophone response to Rayleigh, or ground roll, waves, which contain no deep-earth information, is substantially cancelled from the composite seismic records. The outputs from, say, thirty-six geophones may be connected together in an effort to eliminate the Rayleigh wave component from the composite signals. Often, up to one thousand groups, or arrays, of geophones are included in a single set-up. Obvious disadvantages in the use of such prior art arrangements is the need for a large number of geophones, and the time and effort in properly locating and interconnecting the same. U.S. Pat. No. 3,719,924 is illustrative of such prior art method.

Geophones containing three orthogonally oriented transducers are known as shown, for example, in U.S. Pat. No. 3,344,881, White, 3,872,478, Lucole and 4,783,770, Danbom, which transducers may be positioned to individually respond to vertical, horizontal in-line, and horizontal cross-line components of seismic waves. In the White patent, the three transducer outputs are sent over separate transmission paths, such as a plurality of dual-conductor lines, to a multichannel recorder for recording at separate recording channels. These recorded signals may be played back and processed to suppress Rayleigh wave component response, or the like.

As is well understood, the three orthogonally oriented transducers need not be positioned to individually respond to the vertical, horizontal in-line, and horizontal cross-line components of seismic waves. For example, it is common practice to locate the transducers in a Gal'perin configuration wherein the response axis of each transducer extends at an angle of 54° 23' off of vertical. With such an arrangement the effect of gravity on each transducer is the same.

Geophones containing orthogonal transducer elements and which also include signal processing means for ground roll suppression filtering, signal enhancement, or the like, also are known as shown in U.S. Pat. No. 4,458,341. Using this system, fewer geophones are required to cover the same area as are required using the one-transducer geophones.

SUMMARY OF THE INVENTION AND OBJECTS

An object of this invention is the provision of an improved signal processing method and means for suppression of ground roll wave components (i.e. surface wave noise signal components) from the outputs of one or more transducer elements of a geophone which includes a plurality of orthogonally oriented transducer elements.

An object of this invention is the provision of an improved ground roll suppression method and means of the above-mentioned type which is readily implemented either at the geophone prior to transmission of the seismic wave signals to a remote recorder, or after recording.

The above and other objects and advantages of this invention are achieved by use of a geophone having at least two transducers with axes which are perpendicular to each other. If desired, the geophone may be oriented such that transducers are responsive to vertical and horizontal in-line components of seismic waves. A third transducer at the geophone, when employed, may be responsive to horizontal transverse components of seismic waves. Obviously, where three orthogonal transducers are employed, they may be oriented in any desired manner, including the above-mentioned Gal'perin configuration. Output signals from the perpendicularly-oriented transducers provide seismic data in Cartesian coordinate signal form. Novel signal processing is employed for suppression of ground roll wave components from one or more of the transducer signal outputs.

To this end, the novel ground roll suppression filter converts the Cartesian coordinate signal outputs to polar coordinate signal form which includes vector length and angle values. The polar coordinate signal values are averaged over time windows to obtain vector length and angle values substantially proportional to the ground roll wave component included therein. The ground roll wave component signal values then are subtracted from the original polar coordinate signal values for suppression of the ground roll wave component therefrom. The resultant signals then are converted to Cartesian signal form in preparation for further processing for use in locating underground formations or the like. Such ground roll suppression may take place at the geophone, or at a location remote therefrom. Novel ground roll suppression using signal outputs from three orthogonal transducers or from two perpendicular transducers is contemplated.

BRIEF DESCRIPTION OF THE DRAWINGS

The invention, together with other objects and advantages thereof, will be better understood from the following description when considered with the accompanying drawings. In the drawings, wherein like reference characters refer to the same parts in the several views:

FIG. 3 is a diagram showing the V, R and T signal outputs in both three-dimensional Cartesian and spherical polar coordinate system forms for use in explaining conversion between the two forms;

FIG. 4 is a simplified block diagram of a signal processor which is responsive to V and R transducer signal outputs for suppressing ground roll wave components included therein;

FIG. 5 is a diagram showing V and R signal outputs in both two-dimensional Cartesian and polar coordinate system forms;

FIGS. 7A and 7B are plots of body wave components $V_B$ and $R_B$ and ground roll wave components $V_{GR}$ and $R_{GR}$, respectively.

FIGS. 9A and 9B are plan and side elevational views, respectively, of a three-transducer geophone with the geophones oriented in a Gal'perin configuration, and FIGS. 10A and 10B are similar to FIGS. 9A and 9B but showing a Gal'perin configuration of transducers in a two-transducer geophone.

Seismic sources generate many types of seismic waves including pressure (P-waves), shear (S-waves), Love and Rayleigh waves. The Love and Rayleigh, or ground roll, waves comprise surface waves which travel along the near surface of the earth and, consequently, contain no information concerning deep earth formations. P-waves and S-waves travel downwardly into the earth and may be reflected or refracted back to the earth's surface. They, therefore, contain useful information about the deep subsurface. Generally, S-waves are attenuated faster than P-waves and, therefore, produce much weaker signals at the geophones. The present invention is directed to method and means for the suppression of ground roll wave signal components from the transducer outputs of a multi-transducer geophone which greatly facilitates subsequent analysis of the P-wave and S-wave seismic data.

Figure 1:
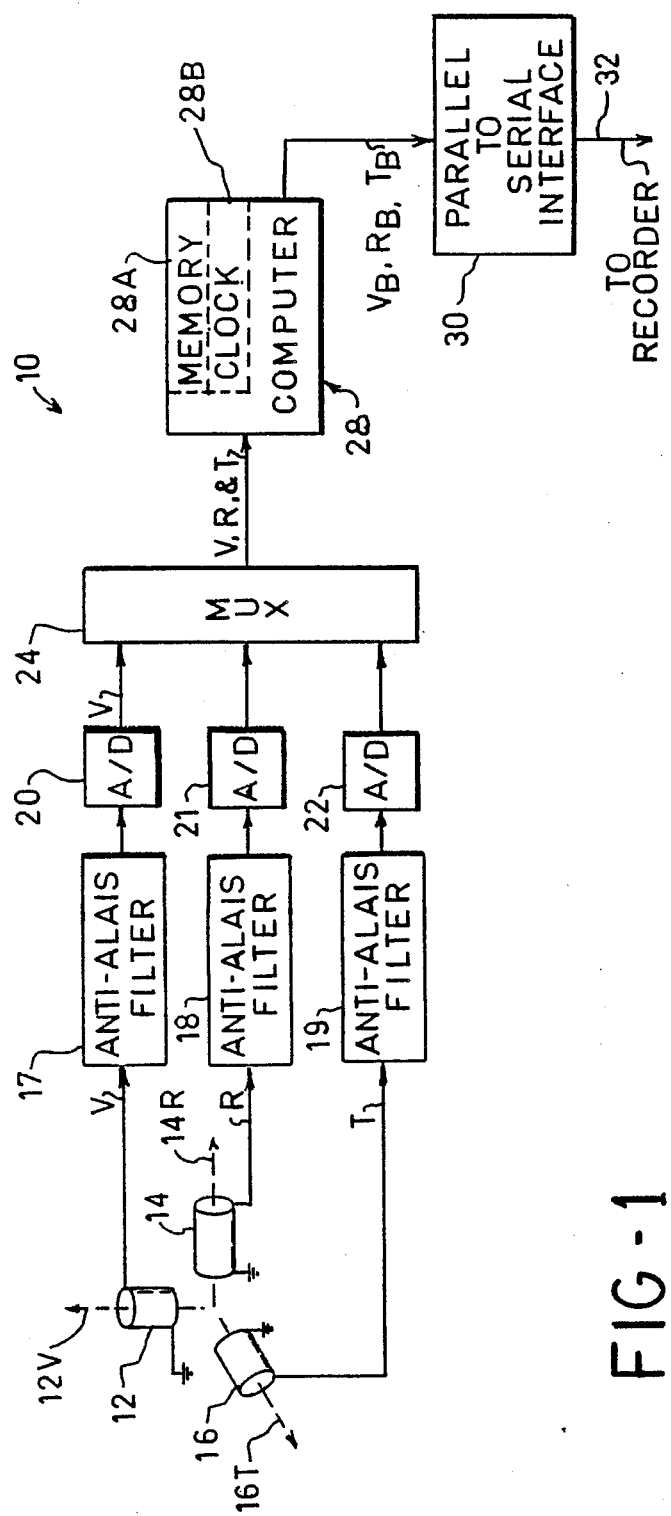
FIG. 1 is a block diagram of a multi-transducer geophone which includes means for suppressing ground roll signal components from the transducer output signals.

Reference now is made to FIG. 1 wherein a geophone identified generally by the reference numeral 10 is shown which includes three orthogonally positioned transducers 12, 14 and 16 responsive to seismic waves. Acoustic transducers of this type are well known which are adapted to operate over the useful frequency range of seismic waves between, say, 2 and 300 Hz. The transducers are located in a conventional geophone housing which includes a leveling bubble for proper leveling of the geophone in use. The geophone is coupled to the earth and, when properly leveled, the axis 12V of transducer 12 extends vertically, and the axes 14R and 16T of transducers 14 and 16, respectively, extend horizontally. In the illustrated arrangement, the axis 14R is directed toward the seismic source, such as a shot point, i.e. radially thereof, and the axis 16T extends transversely thereof. It will be seen that the suffixes V, R and T refer to the orthogonal vertical, radial and transverse axes, respectively.

Output signals designated V, R and T are obtained from the transducers 12, 14 and 16 which signals are connected through anti-alias filters 17, 18 and 19 to analog-to-digital (A/D) converters 20, 21 and 22, respectively, for conversion to digital form. A digital multiplexer 24 sequentially connects the digitized V, R and T signals to a signal processor 28, such as a digital computer having memory 28A and clock 28B. Signal processor 28 simply may comprise a microcomputer which operates to suppress ground roll wave components from the V, R, and T input signals. With suppression of the ground roll wave signal components by the computer, the computer output comprises, essentially, body wave components $V_B$, $R_B$ and $T_B$ of the transducer signals. These body wave components are connected through a parallel to serial interface 30 for transmission to a remote recorder over transmission line 32.

Figure 2:
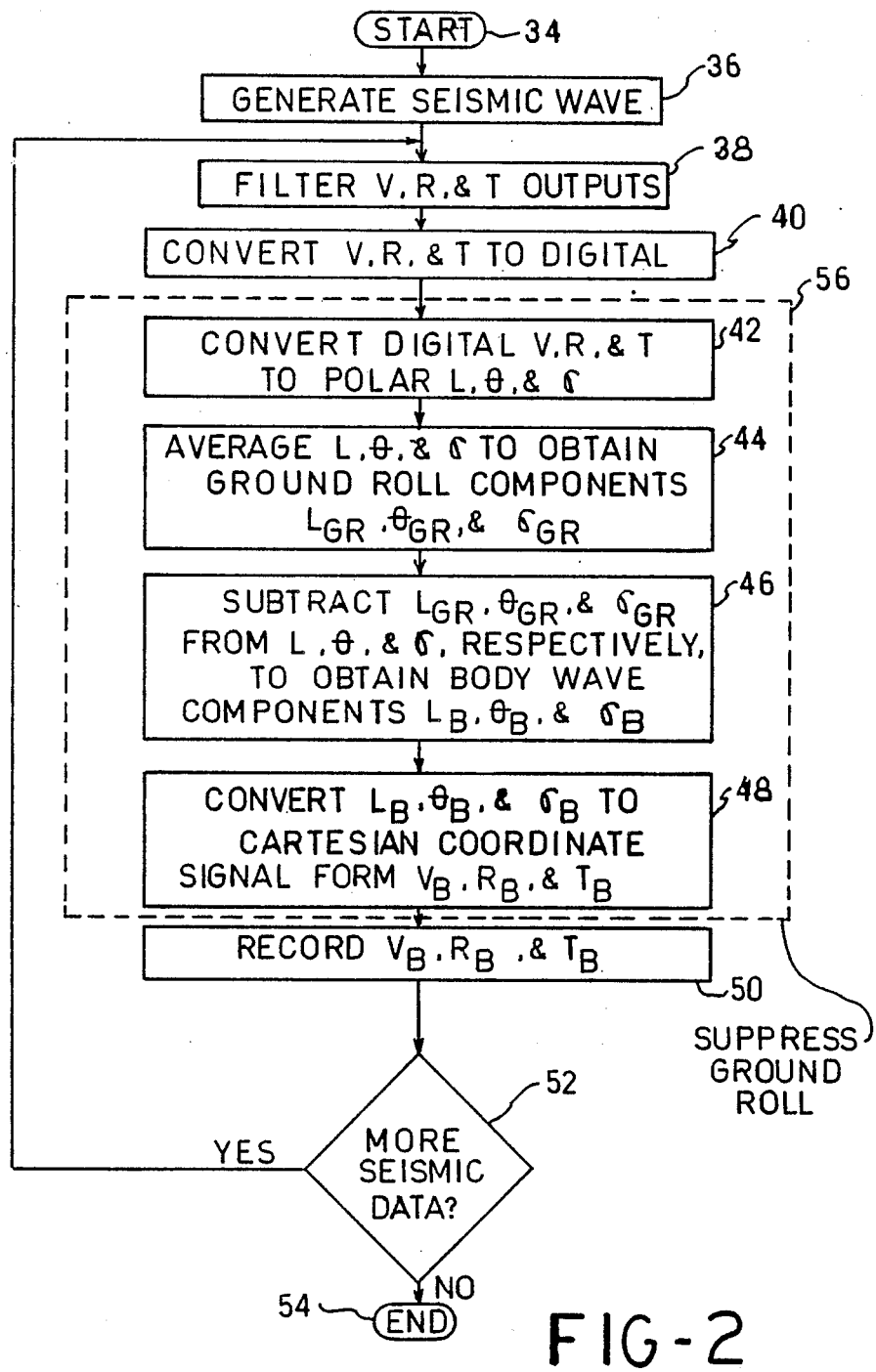
FIG. 2 is a flow chart for use in explaining operation of the geophone of FIG. 1 for ground roll suppression.

Reference now is made to FIG. 2 wherein a flow diagram for use in explaining operation of the system of FIG. 1 is shown. As will become apparent, some of the operations indicated therein are under control of computer 28 responsive to programming instructions contained in memory 28A. Several programming steps are involved in the actual implementation of some of the indicated operations. Since programming of computer 28 to implement those steps performed by the computer is well within the skill of the average programmer a complete program listing is not required and is not included herein.

Preparation for sensing and processing seismic data generated by a seismic wave source is begun at START step 34 at which time counters, registers, timers and the like included in computer 28 are initialized. At step 36, seismic waves are generated at a remote location by a seismic energy source, not shown. In response to seismic waves, transducers 12, 14 and 16 generate V, R and T signals which, at step 38, are filtered by anti-alias filters 17, 18 and 19. At step 40, the V, R and T signals are converted to digital form, which digitized signals are supplied to computer 28.

The digitized V, R and T signals are converted by computer 28 to polar coordinate signal form at step 42. In FIG. 3, to which reference is made, V, R and T signal components are shown along orthogonal axes 12V, 14R and 16T, respectively. These V, R and T signals, in Cartesian coordinate signal form, are converted to spherical polar coordinate signal form at step 42. Conversion to polar coordinate signal form involves determining vector length L and values of angles $\theta$ and $\sigma$. From FIG. 3, it will be seen that:

$$L = \sqrt{V^2 + R^2 + T^2} \qquad (1)$$

where:
$\theta$ is the angle between L and V, and
$\sigma$ is the angle between R and the projection, $L_p$, of L onto the R, T plane.

Next, at step 44, the L, $\theta$ and $\sigma$ signal components are averaged as, for example, by harmonic averaging over a short time window. Computer 28 is well adapted to perform a harmonic, or other, averaging function. As will become apparent, the average values of L, $\theta$ and $\sigma$ produced at step 44 are proportional to the ground roll components $L_{GR}$, $\theta_{GR}$ and $\sigma_{GR}$ of the L, $\theta$ and $\sigma$ signals. At step 46, the ground roll components $L_{GR}$, $\theta_{GR}$ and $\sigma_{GR}$ obtained at step 44 are subtracted from the associated L, $\theta$ and $\sigma$ signal values for the suppression of ground roll components therefrom. Consequently, the polar coordinate signals obtained as a result of subtraction step 46 are proportional to body wave signal components $L_B$, $\theta_B$ and $\sigma_B$ of the seismic signals. The polar coordinate body wave signal components $L_B$, $\theta_B$ and $\sigma_B$ are converted to Cartesian coordinate signal form $V_B$, $R_B$ and $T_B$ at step 48, which step is readily implemented by computer 28. The body wave signal components $V_B$, $R_B$ and $T_B$ are recorded at step 50. Preferably, transmission of the body wave signal components as a serial bit stream to the recorder is provided by use of parallel to serial interface 30 shown in FIG. 1. As is well understood, body wave signal components from a plurality of geophones stations are simultaneously recorded for subsequent analysis.

At decision step 52, the determination is made whether or not additional seismic data is available from transducers 12, 14 and 16. If the decision is affirmative, then step 36 is reentered for continuation of the ground roll suppression process. With this arrangement seismic signals are processed over short sequential time windows during receipt thereof. If decision step 52 is negative, then end step 54 is entered and the signal processing is terminated.

The novel ground roll suppression method of the present invention is included in steps 42 through 48, which steps are shown in block 56 labelled "Suppress Ground Roll". Obviously, the invention does not require that all steps of the ground roll suppression method be effected at the geophone as shown in FIG. 1. Instead, all or part of the ground roll suppression process 56 may take place at a remote location either before or after recording thereof.

As is well understood, body waves (i.e seismic waves without the ground roll wave components) couple substantially equally to the vertical and horizontal in-line transducers. Similarly, ground roll waves couple substantially equally to the vertical and horizontal in line transducers to produce substantially equal ground roll signal components therefrom. Also, as is well understood, these ground roll signal components are substantially ±90° out of phase, whereas the body waves are substantially in phase. Use of such characteristics of body and ground roll wave signal components of seismic waves is made in the novel ground roll suppression method of this invention.

Reference now is made to FIG. 4 wherein a ground roll wave suppressor for removal of ground roll wave components from the V and R outputs from the vertical and horizontal in-line transducers 12 and 14 is shown. The V and R signals are anti-alias filtered, and converted to digital form as in a manner shown in FIG. 1. The digitized V and R signals are supplied to a Cartesian-to-polar coordinate converter 60 where they are converted to polar coordinate signal form L and $\theta$. A two-dimensional Cartesian and polar coordinate system is shown in FIG. 5, to which figure reference is made. As shown in FIG. 5, in two dimensions, the length vector, L, and angle $\theta$ lie in the plane of the V and R signal components, and $\theta$ is identified as the angle between L and V.

In FIG. 4, vector length L is determined at unit 62, and angle $\theta$ is determined at unit 64 of converter 60. At unit 62 the V and R input signals are squared, the squared values are added, and the square root of the sum is determined to obtain vector length L. At unit 64 the angle $\theta$ whose cosine is V/L is determined as, for example, by use of a computer. A phase unwrap, such as a Schaffer's phase unwrap, is implemented in the determination of $\cos^{-1} V/L$, as will become apparent from an examination of signals shown in FIGS. 6A-6C.

Figure 6A:
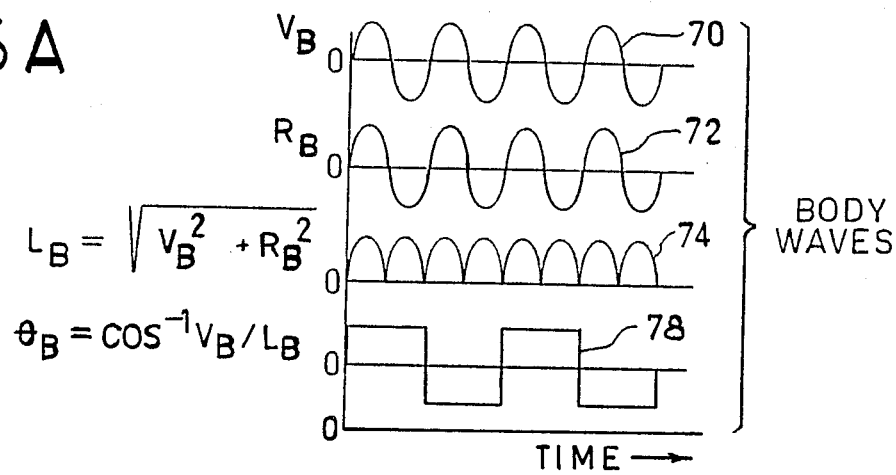
FIGS. 6A, 6B and 6C are diagrams showing signals at different points in the signal processor shown in FIG. 4 for use in explaining operation thereof.
Figure 6B:
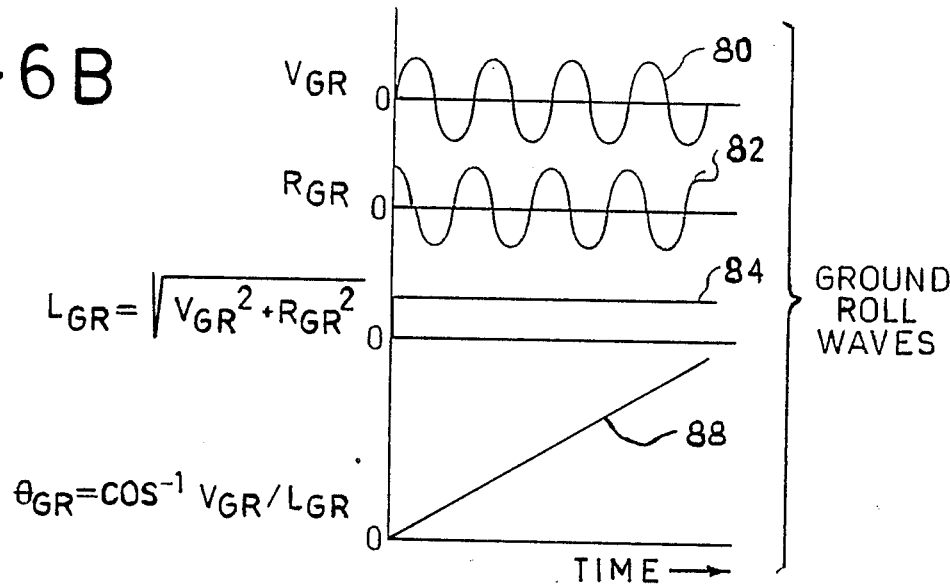
Figure 6C:
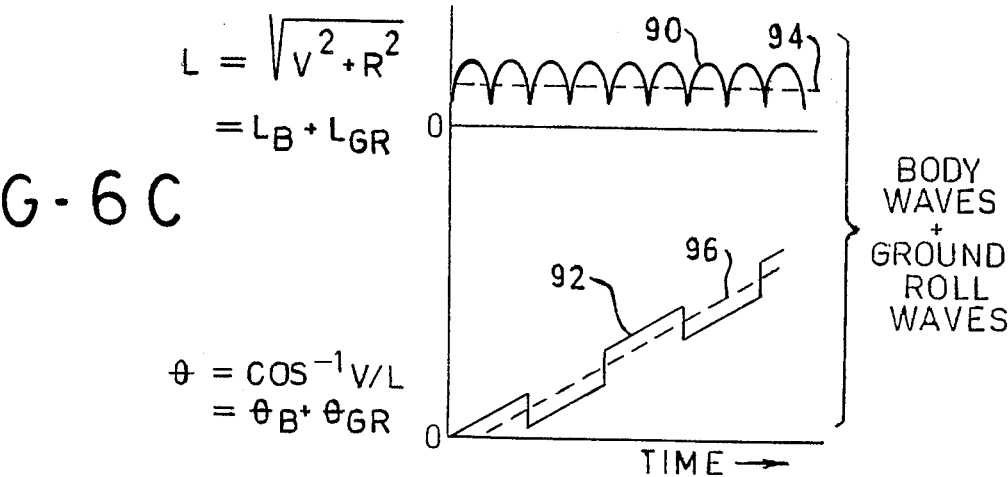

Reference now is made to FIGS. 6A-6C wherein three groups of waveforms are shown which are identified as body waves, ground roll waves, and body plus ground roll waves. In FIG. 6A, reference numerals 70 and 72 identify vertical and horizontal in-line components $V_B$ and $R_B$, respectively, of body waves, which components are shown to be in-phase. (A Cartesian diagram of the in-phase $V_B$ and $R_B$ components is shown in FIG. 7A.) In FIG. 6A a plot of vector length, $L_B$, of the body wave component from unit 62 with inputs 70 and 72 thereto is identified by reference numeral 74, and is shown to comprise a series of half sine waves.

Reference numeral, 78 identifies the inverse cosine of $V_B/L_B$. As noted above, inverse cosine taker 64 shown in FIG. 4 implements a phase unwrap such that with the illustrated inputs 70 and 72 thereto, $\theta_B$ changes polarity every cycle of $V_B$ and $R_B$. Consequently, the plot of $\theta_B$ comprises a square wave with alternating plus and minus values.

In FIG. 6B, vertical and horizontal in-line components $V_{GR}$ and $R_{GR}$ of ground roll waves are identified by reference numerals 80 and 82, respectively, which waves are shown to be out of phase by 90°. (A Cartesian diagram of the out-of-phase $V_{GR}$ and $R_{GR}$ components is shown in FIG. 7B.) A plot of vector length, $L_{GR}$, of the ground wave component from unit 62 with inputs 80 and 82 thereto is identified by reference numeral 84. The vector length $L_{GR}$ of the ground roll component, from unit 62 comprises a substantially constant value and with the illustrated inputs 80 and 82 supplied thereto is a constant.

The inverse cosine of $V_{GR}/L_{GR}$, comprising $\theta_{GR}$, is identified by reference numeral 88. From FIG. 6B, it will be seen that with inputs 80 and 82 supplied to unit 64, $\theta_{GR}$ increases with increasing time since a phase unwrap is employed at inverse cosine taker 64.

In FIG. 6C, plots of outputs L and $\theta$ from units 62 and 64 of FIG. 4 with input signals V and R which include both body wave components $V_B$ and $R_B$ (waves 70 and 72) and ground roll wave components $V_{GR}$ and $R_{GR}$ (waves 80 and 82) are identified by reference numerals 90 and 92, respectively.

In FIG. 4, ground roll suppressor 66 is shown to include averaging means 100 and 102 to which the vector L and angle $\theta$ signal values (identified by reference numerals 90 and 92 in FIG. 6C) from the Cartesian-to-polar coordinate converter 60 are supplied. In FIG. 6C average values of the L and $\theta$ outputs (90 and 92) are identified by broken lines 94 and 96, respectively. It here will be noted that average 94 is substantially proportional to ground roll vector $L_{GR}$, (reference numeral 84) and that average 96 is substantially proportional to angle $\theta_{GR}$ of the ground roll component (reference numeral 88). Any suitable averaging method may be employed including the use of simple averages, harmonic averages, fitting a straight line, fitting a second or higher order line, fitting a plane, and fitting a second order or higher order surface to the data points. For example, a straight line may be fitted using minimum mean-squared fitting techniques over a series of limited time windows. A harmonic average, HA, may be obtained during each sequential time window by summing the reciprocal of the data points present during the window, then determining the reciprocal of the sum.

For example only if four data points L1, L2, L3 and L4 are included in a time window, then $$1/HA = 1/L1 + 1/L2 + 1/L3 + 1/L4 \qquad (4)$$

The harmonic average is the reciprocal of equation (4). Presently, harmonic averaging is believed to comprise the preferred averaging method for use in the present invention. Regardless of the averaging method employed, the outputs from averagers 100 and 102 are substantially proportional to the ground roll components $L_{GR}$ and $\theta_{GR}$ of the seismic signals L and $\theta$, respectively.

Outputs $L_{GR}$ and $\theta_{GR}$ from averaging means 100 and 102 are supplied to subtractors 104 and 106, respectively, along with outputs L and $\theta$ from units 62 and 64. At the subtractors the ground roll components $L_{GR}$ and $\theta_{Gr}$ are subtracted from the respective L and $\theta$ signal values for the suppression of the ground roll components therefrom. Outputs $L_B$ and $\theta_B$ from the subtractors, therefore, substantially comprise only the body wave components of the L and $\theta$ signal values.

Currently, when seismic data in Cartesian coordinate form is acquired using multi-transducer geophones, analysis thereof requires that the data be in Cartesian coordinate form. Therefore, for use with known methods of analyzing the data, the $L_B$ and $\theta_B$ polar coordinate signals are converted to Cartesian signal form. Current seismic data analysis methods for obtaining information concerning deep earth formations may employ only the V component signals, both the V and R component signals, or all three Cartesian coordinate signals V, R and T. In FIG. 4, the $L_B$ and $\theta_B$ polar coordinate signals are converted to Cartesian coordinate signal form by use of polar-to-Cartesian coordinate converter 110. Converter 110 includes units 112 and 114 to which both the $L_B$ and $\theta_B$ signals are supplied. At unit 112 the cosine of angle $\theta_B$ is determined, and $\cos\theta_B$ is multiplied by $L_B$ to obtain an output at line 116 which is proportional to the vertical component signal $V_B$ of the body wave. Where the method of analysis of the seismic data does not require the horizontal in-line component of body waves, only unit 112 is required at converter 110.

The horizontal in-line component $R_B$ of the body wave component is determined at unit 114 where the sine of angle $\theta_B$ is determined, and $\sin\theta_B$ is multiplied by $L_B$. The output $L_B\sin\theta_B$ at line 118 from unit 114 therefore comprises a signal which is proportional to the horizontal in-line component, $R_B$, of the body wave. Both the ground-roll-suppressed $V_B$ and $R_B$ signal components are available for recording and further processing along with corresponding ground-roll-suppressed vertical and horizontal in-line signals from other geophones in the array.

As is well understood, ground roll, or Rayleigh, waves generally are not directly coupled to the horizontal transverse transducer 16. However, reflected ground roll signals may be coupled thereto, as well as ground roll signals resulting from traffic or other "cultural" noise. Therefore, it may be desired to include the T signal output from horizontal transverse transducer 16 in the ground roll suppression process.

Figure 8:
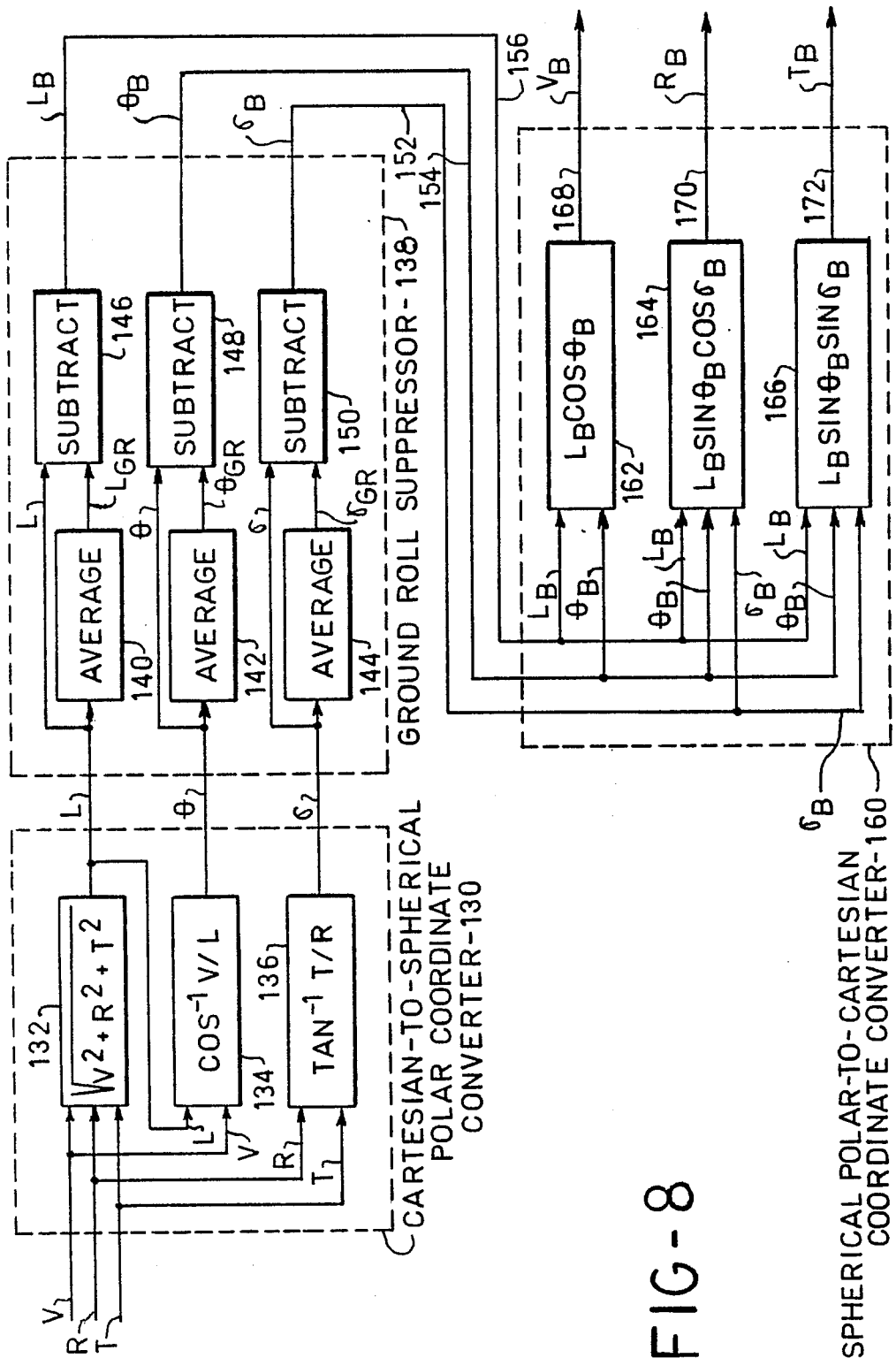
FIG. 8 shows a simplified block diagram of a signal processor for suppressing ground roll wave components which is similar to that of FIG. 4 but which employs V, R and T, transducer signal outputs from three orthogonal transducers.

Reference now is made to FIG. 8 wherein a ground roll suppressor which is responsive to the three Cartesian coordinate seismic signals V, R and T is shown. The analog signal outputs V, R and T from transducers 12, 14 and 16 are filtered and converted to digital form as in a manner shown in FIG. 1. The digitized V, R and T signals are supplied to Cartesian-to-spherical polar coordinate converter 130 for conversion into spherical polar coordinate form. Converter 130 includes unit 132 for computing vector length L, unit 134 for computing angle $\theta$ between vector L and vertical component V, and unit 136 for computing angle $\sigma$ between horizontal in-line component R and the projection, $L_p$, of L onto the R, T plane. The spherical coordinate components L, $\theta$ and $\sigma$ are shown in FIG. 3.

Vector length L is obtained by solving for the square root of the sum of the squares of the V, R and T signal components at unit 132. The vector length L from unit 132, together with the V signal component, are supplied as inputs to unit 134 where the inverse cosine of V/L is computed, which comprises the angle $\theta$. Unit 136 is shown provided with R and T signal inputs for the computation of angle $\sigma$ which equals the inverse tangent of T/R. Both processes of determining $\theta$ and $\sigma$ implement a phase unwrap, such as a Schaffer's phase unwrap using a digital computer.

From FIG. 3, it will be apparent that $L_p = L\sin\theta$, and that angle $\sigma = \sin^{-1} T/L_p$. Therefore, the angle $\sigma$ could be determined from inputs $\theta$, L, and T supplied to a unit which solves for $\sin^{-1} T/L\sin\theta$.

The L, $\theta$ and $\sigma$ signal values from converter 130 are supplied to ground roll suppression unit 138 for suppression of the ground roll components included therein. Suppressor 138 operates in the same manner as suppressor 66 except that angle signal, $\sigma$, is processed in addition to the L and $\theta$ signals. The L, $\theta$ and $\sigma$ signals are supplied to averagers 140, 142 and 144, respectively. As described above, averaging results in the production of signals proportional to the ground roll components $L_{GR}$, $\theta_{GR}$ and $\sigma_{GR}$ of the respective inputs L, $\theta$ and $\sigma$. At subtractors 146, 148 and 150 the ground roll components $L_{GR}$, $\theta_{GR}$ and $\sigma_{GR}$ are subtracted from the respective L, $\theta$ and $\sigma$ signal values to provide output signals $L_B$, $\theta_B$ and $\sigma_B$ in which ground roll components are substantially suppressed.

The ground-roll-suppressed $L_B$, $\theta_B$ and $\sigma_B$ signals are supplied over lines 152, 154 and 156, respectively, to converter 160 for conversion thereof to three-dimensional Cartesian coordinate signal form. Converter 160 includes units 162, 164 and 166 for determining $V_B$, $R_B$ and $T_B$, respectively. At unit 162 the cosine of $\theta_B$ is determined and the resultant value is multiplied by $L_B$ to obtain an output at line 168 which is proportional to the vertical component, $V_B$, of the body wave.

At unit 164, which is responsive to $L_B$, $\theta_B$ and $\sigma_B$, $\sin\theta_B$ and $\cos\sigma_B$ are determined, and the product $L_B\sin\theta_B \cos\sigma_B$ is calculated to provide a signal output at line 170 which is proportional to $R_B$. At unit 166, which also is responsive to $L_B$, $\theta_B$ and $\sigma_B$, $\sin\theta_B$ and $\sin\sigma_B$ are determined, and the product $L_B\sin\theta_B\sin\sigma_B$ is calculated to provide a signal output at line 172 which is proportional to $T_B$. The above described relationships used in the conversion from spherical polar coordinate form to three-dimensional Cartesian coordinate signal form are apparent from an examination of FIG. 3. The body wave components $V_B$, $R_B$ and $T_B$ from converter 160 may be recorded together with outputs from other multi-transducer geophones included in the geophone arrangement for use in subsequent analysis for identifying deep earth formations.

Although the geophones include transducers whose axes of response are disposed at right angles, it is not required that they be located such that one axis extends in the direction of the seismic source, another vertically, and another transversely. As noted above, Gal'perin coordinates often are employed. For a three-transducer geophone, the orthogonal transducer response axes extend at an angle of 54° 23' relative to a vertical line. In FIGS. 9A and 9B, to which reference now is made, plan and side-elevational views, respectively, of transducers of a three-transducer geophone with Gal'perin coordinates are shown. There, transducers 182, 184 and 186 are shown having response axes 182U, 184V and 186W, respectively, which axes are at an angle of 54° 23' with respect to the vertical. Shot point 188 is located in a vertical plane within which response axis 182U is located, and Cartesian coordinate signal components $U_G$, $V_G$ and $W_G$ are obtained from the respective transducers 182, 184 and 186.

For use as inputs to converter 130 of the ground roll suppressor illustrated in FIG. 8, the anti-alias filtered and digitized Gal'perin Cartesian coordinate signal components $U_G$, $V_G$ and $W_G$ may be converted to the V, R, and T Cartesian coordinate signal form by simple rotation of axes. The process of rotating Cartesian coordinate system axes is well known in the art, and such conversion in the present case simply involves a 45° rotation about axis 182U (FIGS. 9A and 9B) together with a 35.62° rotation about a horizontal transverse axis.

Equations for this conversion are as follows:

$$V = U_G \sin 35.62° + (V_G \sin 45° + W_G \sin 45°) \cos 35.62° \quad (5)$$

$$R = U_G \cos 35.62° - (V_G \sin 45° + W_G \sin 45°) \sin 35.62° \quad (6)$$

$$T = V_G \sin 45° - W_G \sin 45° \quad (7)$$

As noted above, following such rotation of axes, the V, R and T signals are processed in the manner described above in detail for suppression of ground roll.

In FIGS. 10A and 10B, to which reference now is made, a two-dimensional Gal'perin coordinate system of transducers is shown which includes transducers 192 and 194 having perpendicular axes 192U and 192V, respectively, which axes are located in a vertical plane which includes shot point 196. As is apparent, transducers 192 and 194 are responsive to vertical and radial in-line seismic waves but not to transverse waves. After anti-alias filtering and digitizing, the $U_G$ and $V_G$ Gal'perin coordinate output signals from transducers 192 and 194 are converted to V and R signal form by a 45° rotation about a horizontal transverse axis. The resultant V and R signal components then may be supplied as inputs to converter 60 illustrated in FIG. 4 for ground roll suppression in the manner described in detail above.

The invention having been described in detail in accordance with requirements of the patent Statutes, various other changes and modifications will suggest themselves to those skilled in this art. As noted above, the Cartesian-to-polar coordinate conversion, ground roll suppression, and polar-to-Cartesian coordinate conversion operations described with reference to FIGS. 4 and 7 are readily implemented as by use of computer 28 shown in FIG. 1, or by use of a plurality of computers. These operations may take place wholly or partially at individual geophones included in the geophone array. Alternatively, the signal outputs from orthogonal transducers may be transmitted to a remote location for recording, along with signals from other multi-transducer geophones in the array, before the novel ground roll suppression method is performed. Also, it will be apparent that the coordinate conversion and ground roll suppression operations included in the ground roll suppression method of this invention may be performed using digital circuitry other than general purpose digital computers, if desired; the circuit functions being shown in FIGS. 1 and 8 of the drawings. As noted above, averaging of the polar coordinate signals is not limited to use of the harmonic averaging method. Also, processing of the $U_G$, $V_G$ and $W_G$ Gal'perin component signals without converting to conventional Cartesian coordinate signals V, R and T also is contemplated. It is intended that the above and other such changes and modifications shall fall within the spirit and scope of the invention as defined in the appended claims.

I claim:

1. A method of processing seismic data in Cartesian coordinate signal form obtained from a geophone which includes at least two motion-sensing transducers having perpendicular axes, which seismic data includes a surface wave noise signal component, comprising the steps of,
   (a) converting the Cartesian coordinate signals from the geophone transducers to polar coordinate signal form including vector length and angle signal values, and
   (b) attenuating surface wave noise signal components in the polar coordinate signals.

2. A method of processing seismic data as defined in claim 1 including,
   (c) converting the polar coordinate signals obtained in step (b) to Cartesian coordinate signal form.

3. A method of processing seismic data as defined in claim 1 wherein step (b) comprises
   (1) individually averaging the vector length and angle signal values for obtaining vector length and angle signal values proportional to the surface wave noise signal component,
   (2) subtracting the noise signal vector length and angle signal values from the vector length and angle signal values obtained in step (a) for attenuating the surface wave noise signals.

4. A method of processing seismic data as defined in claim 1 wherein the Cartesian coordinate seismic data from the geophone is in Gal'perin coordinate signal form where Gal'perin is a Cartesian coordinate system in which all axes are at the same angle relative to vertical.

5. A method of processing seismic data as defined in claim 1 wherein the seismic data includes V and R signal components generated in response to vertical and horizontal in-line seismic wave motion, respectively, of the geophone, and step (a) includes,
   (1) converting the V and R signal components to vector length L and angle $\theta$ signal values where $\theta$ is the angle between the V or R signal component and the vector L.

6. A method of processing seismic data as defined in claim 1 wherein the seismic data includes V, R and T signal components generated in response to vertical, horizontal in-line, and horizontal transverse seismic wave motion of the geophone, respectively, and step (a) includes,
   (1) converting the V, R and T signal components into spherical polar coordinate signal form.

7. A method of processing seismic data as defined in claim 1 wherein the seismic data includes V, R and T signal components generated in response to vertical, horizontal in-line, and horizontal transverse seismic wave motion of the geophone, respectively, and wherein step (a) includes converting the V, R, and T signal components to vector length, L, and angle θ signal values where θ is the angle between the V or R signal component and the L vector, and $$L = \sqrt{V^2 + R^2 + T^2}.$$

8. A method of processing seismic data as defined in claim 7 wherein step (b) includes,
averaging the vector length, L, signal to obtain a vector length ground roll signal component $L_{GR}$,
subtracting $L_{GR}$ from L to obtain a ground roll wave suppressed vector length body wave signal component, $L_B$,
averaging the angle θ signal to obtain an angle ground roll signal component, $θ_{GR}$, and
subtracting $θ_{GR}$ from θ to obtain a ground roll wave suppressed angle body wave signal component, $θ_B$.

9. A method of processing seismic data as defined in claim 8 wherein the Cartesian coordinate seismic data from the geophone is in Gal'perin coordinate signal form where Gal'perin is a Cartesian coordinate system in which all axes are at the same angle relative to vertical.

10. A method of processing seismic data as defined in claim 8 including
converting the ground roll wave suppressed vector length and angle signals $L_B$ and $θ_B$, respectively, to a ground roll wave suppressed signal, $V_B$ proportional to vertical seismic body wave motion.

11. A method of processing seismic data as defined in claim 10 wherein the step of converting the ground roll wave suppressed signals to a ground roll wave suppressed signal, $V_B$ is performed according to the following expression $$V_B = L_B \cos θ_B.$$

12. A method of seismic exploration in which seismic waves are generated at a point at the earth's surface and received at a plurality of geophones at spaced distances from the seismic source, said method including,
generating separate V and R component signals at the geophones in response to vertical and horizontal in-line seismic wave motion, respectively, of the geophone,
converting the V and R component signals to polar coordinate signal form including vector length, L and angle, θ, signals,
suppressing ground roll wave signal components generated at the geophones from the L and θ signals to produce ground roll wave suppressed signals $L_B$ and $θ_B$, and
converting the ground roll wave suppressed signals $L_B$ and $θ_B$ to a ground roll wave suppressed signal, $V_B$, proportional to vertical seismic body wave motion.

13. A method of seismic exploration as defined in claim 12 including,
converting the ground roll suppressed L and θ signals to a ground roll suppressed signal, $R_B$, proportional to in-line seismic body wave motion.

14. A method of seismic exploration as defined in claim 12 including,
generating a separate T component signal at the geophones in response to horizontal transverse seismic wave motion at the geophone, wherein the step of converting the V and R component signals includes converting the V, R and T component signals to spherical polar coordinate signal form.

15. In a seismic system, the combination comprising, at least one geophone for sensing seismic waves generated by a seismic energy source a spaced distance from the geophone, said geophone including at least two motion-sensing transducers having response axes which are perpendicular for generating Cartesian coordinate signals in response to at least vertical and horizontal in-line seismic wave motion of the geophone,
Cartesian-to-polar coordinate signal converting means for converting the Cartesian coordinate signals to polar form including vector length, L and angle, θ, signals,
signal processing means responsive to the L and θ signals for suppressing ground roll wave signal components and producing ground roll suppressed signals $L_B$ and $θ_B$, and
means for converting the ground roll suppressed signals $L_B$ and $θ_B$ to a ground roll suppressed signal $V_B$ proportional to vertical seismic body wave motion.

16. In a seismic system as defined in claim 15 including,
means for converting the ground roll suppressed signals $L_B$ and $θ_B$ to a ground roll suppressed signal $R_B$ proportional to in-line seismic body wave motion.

17. In a seismic system as defined in claim 15 wherein the geophone response axes have Gal'perin coordinates where Gal'perin is a Cartesian coordinate system in which all axes are at the same angle relative to vertical.

18. In a seismic system, the combination comprising, at least one geophone for sensing seismic waves generated by a seismic energy source a spaced distance from the geophone, said geophone including at least three motion-sensing transducers having response axes which are orthogonal for generating Cartesian coordinate signals in response to vertical, horizontal in-line, and horizontal transverse seismic wave motion of the geophone,
Cartesian-to-polar coordinate signal converting means for converting Cartesian coordinate signals from the geophone to spherical polar form including vector length L, angle θ, and angle σ signals,
signal processing means responsive to the L, θ and σ signals for suppressing ground roll wave signal components and producing ground roll wave suppressed signals $L_B$, $θ_B$ and $σ_B$, and
means for converting the ground roll wave suppressed signals $L_B$, $θ_B$ and $σ_B$ to ground roll wave suppressed signals $V_B$, $R_B$ and $T_B$, respectively, proportional to vertical, in-line, and transverse seismic wave motion, respectively.

19. In a seismic system as defined in claim 18 wherein the geophone response axes have Gal'perin coordinates where Gal'perin is a Cartesian coordinate system in which all axes are at the same angle relative to vertical.

* * * * *